(12) United States Patent
Jiang et al.

(10) Patent No.: US 10,372,113 B2
(45) Date of Patent: Aug. 6, 2019

(54) METHOD FOR DEFOCUS DETECTION

(71) Applicant: KLA-Tencor Corporation, Milpitas, CA (US)

(72) Inventors: Xuguang Jiang, Sunnyvale, CA (US); Shifang Li, Pleasanton, CA (US); Yong Zhang, Cupertino, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 174 days.

(21) Appl. No.: 15/669,030

(22) Filed: Aug. 4, 2017

(65) Prior Publication Data

US 2018/0088560 A1 Mar. 29, 2018

Related U.S. Application Data

(60) Provisional application No. 62/399,251, filed on Sep. 23, 2016.

(51) Int. Cl.
*G06F 17/50* (2006.01)
*G05B 19/418* (2006.01)
(Continued)

(52) U.S. Cl.
CPC .......... *G05B 19/418* (2013.01); *G06T 7/0004* (2013.01); *G06T 7/11* (2017.01); *G06T 7/174* (2017.01); *G05B 2219/45027* (2013.01); *G05B 2219/45031* (2013.01); *G06T 2207/10024* (2013.01); *G06T 2207/10148* (2013.01);
(Continued)

(58) Field of Classification Search
CPC ........ G05B 19/418; G05B 2219/45027; G05B 2219/45031; G06T 2207/10024; G06T 2207/30148; G06T 7/0004; G06T 2207/10148; G06T 2207/10152; G06T 2207/30168; G06T 7/11; G06T 7/174
See application file for complete search history.

(56) References Cited

U.S. PATENT DOCUMENTS 6,985,220 B1 1/2006 Chen et al.
2009/0286173 A1* 11/2009 Ushirokawa ......... B23K 26/032
430/30
(Continued)

FOREIGN PATENT DOCUMENTS

JP 2013156269 A 8/2013
JP 5526014 B2 6/2014

OTHER PUBLICATIONS

ISA/KR, International Search Report for PCT/US2017/051901 dated Nov. 30, 2017.

*Primary Examiner* — Vuthe Siek
(74) *Attorney, Agent, or Firm* — Hodgson Russ LLP

(57) ABSTRACT

Two or more color data can be combined to form a new data source to enhance sensitivity to defocus signal. Defocus detection can be performed on the newly formed data source. In a setup step, a training wafer can be used to select the best color combination, and obtain defocus detection threshold. This can include applying a segment mask, calculating mean intensities of the segment, determining a color combination that optimizes defocus sensitivity, and generating a second segment mask based on pixels that are above a threshold to sensitivity. In a detection step, the selected color combination is calculated, and the threshold is applied to obtain defocus detection result.

19 Claims, 5 Drawing Sheets

(51) Int. Cl.
*G06T 7/00* (2017.01)
*G06T 7/11* (2017.01)
*G06T 7/174* (2017.01)

(52) U.S. Cl.
CPC ............... *G06T 2207/10152* (2013.01); *G06T 2207/30148* (2013.01); *G06T 2207/30168* (2013.01)

(56) References Cited

U.S. PATENT DOCUMENTS

| | | | |
|---|---|---|---|
| 2011/0085173 A1* | 4/2011 | Waller | G01J 9/00 356/484 |
| 2013/0016895 A1 | 1/2013 | Song et al. | |
| 2014/0114597 A1 | 4/2014 | Chen et al. | |
| 2016/0344921 A1* | 11/2016 | Saito | H04N 5/23212 |
| 2016/0371826 A1* | 12/2016 | Vajaria | G06T 7/11 |

* cited by examiner

METHOD FOR DEFOCUS DETECTION

CROSS-REFERENCE TO RELATED APPLICATIONS

This application claims priority to the provisional patent application filed Sep. 23, 2016 and assigned U.S. App. No. 62/399,251, the disclosure of which is hereby incorporated by reference.

FIELD OF THE DISCLOSURE

This disclosure relates to lithography defocus detection.

BACKGROUND OF THE DISCLOSURE

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

As critical dimensions shrink, better lithographic resolution is needed to print smaller features. Lithography depth of focus is being reduced, which means that minor problems will affect lithography focus, such as alignment issues or mechanical vibration. In lithography, an out-of-focus exposure of features in a photoresist can smear the photoresist edges, which can result in incorrect lateral feature dimensions. The semiconductor yield will suffer if this defocus is not detected. Without effective inspection, defocus problems may not be detected until many manufacturing steps after the lithography step.

Existing macro-inspection systems will find it more difficult to detect defocus as critical dimensions shrink. The development of new techniques with increased sensitivity for defocus detection, both for localized and extended defocus defects, will be important as critical dimensions continue to decrease.

Conventional algorithms perform defect detection on data from each color source independently and then combine the detection result. No single color source is sensitive to all defocus values. The overall defocus detection is poor with only strong defocus being detectable. Therefore, an improved defocus detection technique is needed.

BRIEF SUMMARY OF THE DISCLOSURE

In a first embodiment, a method is provided. A segment mask is applied on a die of a wafer thereby forming a segment on the die. A mean intensity of the segment is calculated in red, green, and blue colors using a bright field mode and in red, green, and blue colors using a dark field mode. Defocus value is compared against the mean intensities. A color combination that optimizes defocus sensitivity is determined. Sensitivity to defocus is determined for each pixel in the segment. A threshold to the sensitivity is applied for each pixel. A second segment mask on the die is generated based on pixels that are above the threshold to the sensitivity. Each of these steps can be performed using a controller.

The wafer may be a training wafer with focus modulations.

The wafer can include a plurality of the dies. The generating and the calculating can be repeated for each of the dies on the wafer.

The segment mask can be configured to cover part of the die.

The comparing can include generating a scatter plot of defocus value versus the mean intensity.

The method can further comprise adjusting the threshold using the controller.

An average intensity of all pixels within a die may be used when applying the threshold to the sensitivity for each pixel.

In a second embodiment, a non-transitory computer readable medium storing a program is provided. The program is configured to instruct a processor to: apply a segment mask on a die thereby forming a segment on the die; calculate a mean intensity of the segment with data including red, green, and blue colors using a bright field mode and with data including red, green, and blue colors using a dark field mode; compare defocus value against the mean intensities; determine a color combination that optimizes defocus sensitivity; determine sensitivity to defocus for each pixel in the segment; apply a threshold to the sensitivity for each pixel; and generate a second segment mask on the die based on pixels that are above the threshold to the sensitivity.

A wafer can include a plurality of the dies. The generating and the calculating can be repeated for each of the dies on the wafer.

The segment mask can be configured to cover part of the die.

Comparing the defocus value can include generating a scatter plot of the defocus value versus the mean intensity.

The program can be configured to adjust the threshold.

An average intensity of all pixels within a die may be used when applying the threshold to the sensitivity for each pixel.

In a third embodiment, a system is provided. The system includes a chuck configured to hold a wafer; a measurement system configured to measure a surface of the wafer; and a controller in electronic communication with the measurement system. The controller includes a processor, an electronic data storage unit in electronic communication with the processor, and a communication port in electronic communication with the processor. The measurement system provides an image of the wafer using a bright field mode and a dark field mode. The controller is configured to: apply a segment mask on a die of the wafer thereby forming a segment on the die; calculate a mean intensity of the segment with data including red, green, and blue colors using a bright field mode and with data including red, green, and blue colors using a dark field mode; compare defocus value against the mean intensities; determine a color combination that optimizes defocus sensitivity; determine sensitivity to defocus for each pixel in the segment; apply a threshold to the sensitivity for each pixel; and generate a second segment mask on the die based on pixels that are above the threshold to the sensitivity.

The wafer can include a plurality of dies.

The segment mask applied by the controller can be configured to cover part of the die.

Comparing the defocus value can include generating a scatter plot of the defocus value versus the mean intensity.

The controller can be configured to adjust the threshold.

An average intensity of all pixels within a die may be used when applying the threshold to the sensitivity for each pixel.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Two or more color data can be combined to form a new data source. The color combination enhances sensitivity to defocus signal. Defocus detection is performed on the newly formed data source. The techniques disclosed herein can be used for lithography defocus detection.

The techniques can involve a setup step and a detection step. In the setup step, a training wafer can be used to select the best color combination, and to obtain defocus detection threshold. In the detection step, the selected color combination can be calculated, and the threshold can be applied to obtain defocus detection result.

Figure 1:
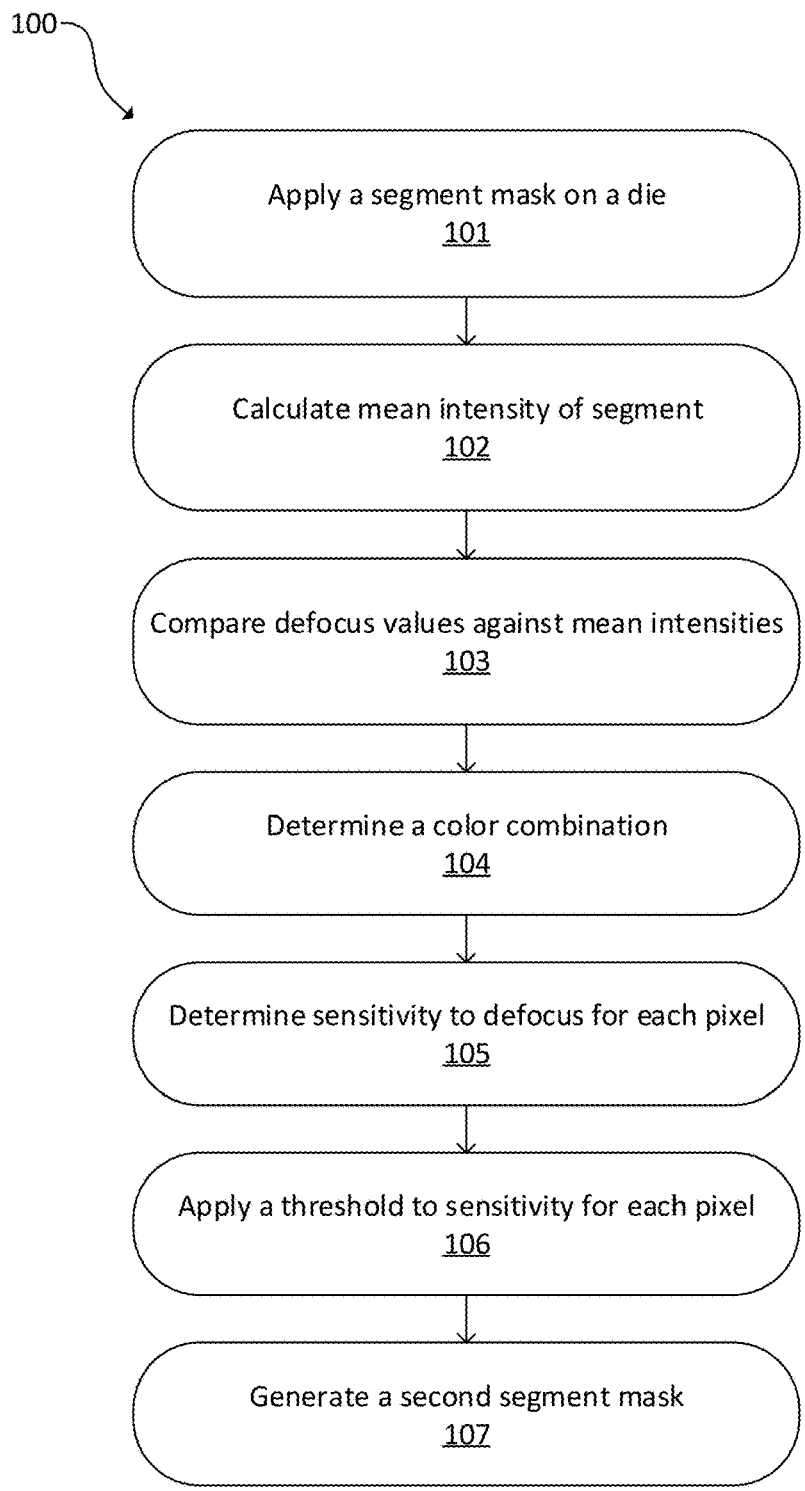
FIG. 1 is a flowchart of an embodiment of a method in accordance with the present disclosure.

FIG. 1 is a flowchart of an embodiment of a method 100. Some or all of the steps in the method 100 may be performed by a controller.

Figure 3A:
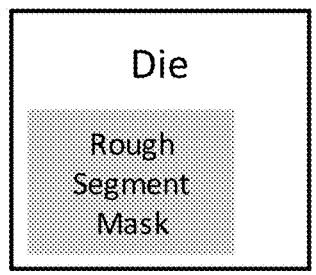
FIGS. 3A-3F are examples of the various steps of FIG. 1.

A segment mask is applied on a die of a wafer at 101 (e.g., to an image of a die of a wafer) thereby forming a segment on the die. This segment mask may be referred to as a rough segment mask. An example can be seen in FIG. 3A. The rough segment mask can be used to focus on an area or areas known to be sensitive to defocus. The segment mask can be chosen by a user. For example, a user can choose the segment mask based on knowledge of the die pattern layout. If this is not possible, then the entire die can be used as the rough segment mask. The rough segment mask also can be obtained from a design. For example, a rectangle or other shape can cover part of the die to form the segment, such as the periphery area of the die (e.g., area not occupied by memory cells).

At 102 in FIG. 1, a mean intensity of the segment is calculated in red, green, and blue colors using a bright field mode and in red, green, and blue colors using a dark field mode. Areas of the segment that are not sensitive to defocus may be included to obtain additional information.

Figure 2:
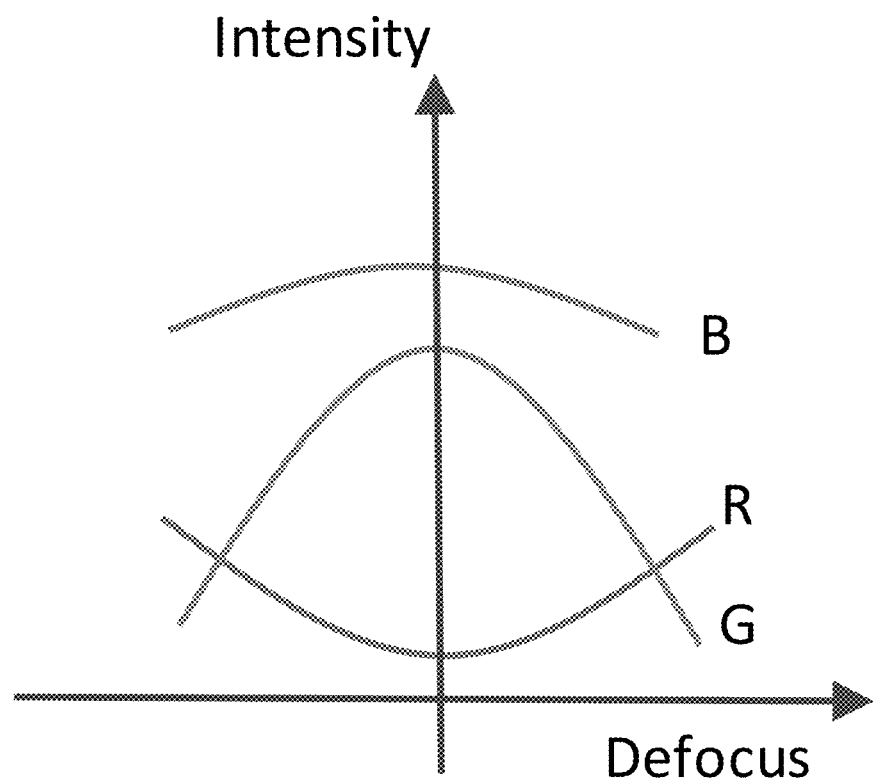
FIG. 2 is an exemplary chart comparing intensity versus defocus for three colors using either bright field or dark field illumination.

One or more defocus values are compared against the mean intensities at 103. Each die can have a defocus value. The comparing can include generating a scatter plot of defocus value versus the mean intensity. The example of FIG. 2 uses trend lines instead of a scatter plot for simplicity. In the example of FIG. 2, red color (R) intensity increases with defocus and green color (G) intensity decreases with defocus. Blue color (B) also is shown. Thus, a new data which equals red divided by green (R/G) will increase more with defocus, which will be more sensitive to defocus signal. R/B, (R*R)/(G*B), R−G, B*G, or B+G are other possible color combination candidates.

Figure 3B:
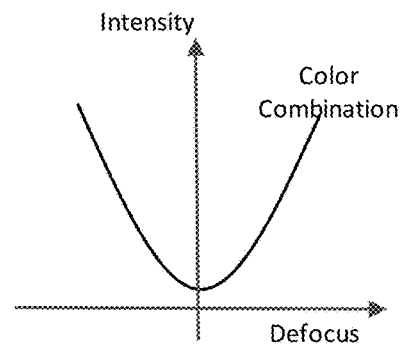

Turning back to FIG. 1, a color combination that optimizes defocus sensitivity (e.g., red divided by green) is determined at 104. A user or algorithm can choose several color combinations. Scatter plots can be created for each color combination, such as that seen in FIG. 3B. The user or algorithm can then choose the best one. In an instance, a new data is created for each of the candidate color combinations. A segment mean of every die of the new data is calculated. The same scatter plot for every new data is created. The combination that is most sensitive to defocus is then selected.

Each process step may have a different combination that optimizes defocus sensitivity. For each device and each process step or lithography step, the patterns on the wafer are fixed. Thus, the best color combination also may be fixed. However, the color combination need to be re-selected for a different device or different process step.

The relationship between defocus and intensity may be compared or plotted for the color combination that optimizes defocus sensitivity. This can verify that the combination is better than any of the individual colors or modes.

Figure 3C:
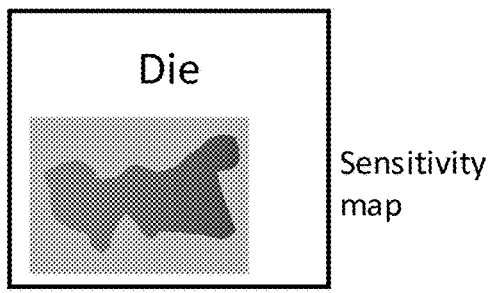
Figure 3D:
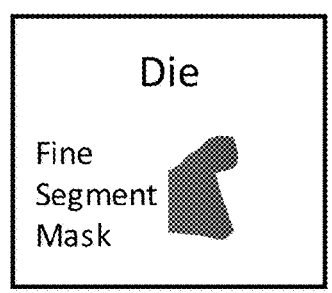

Sensitivity to defocus for each pixel in the segment is determined at 105 in FIG. 1. For every pixel in the rough segment, the new data's sensitivity to defocus is calculated. For example, a sensitivity map is shown in FIG. 3C. The pixels that are most sensitive to defocus may be selected to form a second segment mask, which may be referred to as a fine segment mask. An exemplary fine segment mask is shown in FIG. 3D. The fine segment mask in FIG. 3D is based on the sensitivity map in FIG. 3C.

A threshold to the sensitivity for each pixel is applied at 106 in FIG. 1. All pixels within the fine segment mask must be above the threshold.

Figure 3E:
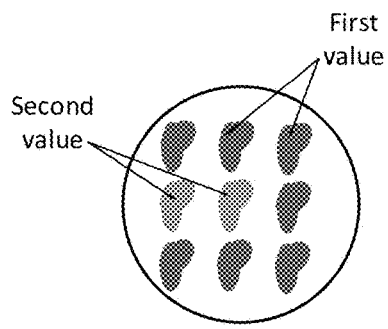

In an instance, a difference intensity for all pixels in the fine segment mask is calculated on every die. In an example, FIG. 3E illustrates a difference intensity shown with two different values. Regarding the first values, only two of the seven are noted for simplicity. The threshold on difference intensity is tuned to detect defocus. Thus, the threshold may be adjusted.

Figure 3F:
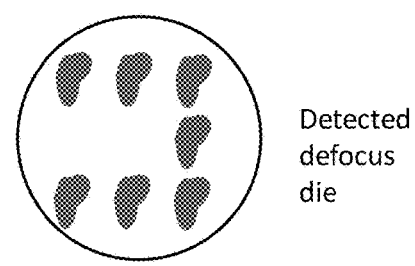

At 107 of FIG. 1, a second segment mask on the die is generated based on pixels that are above the threshold to the sensitivity. FIG. 3F applies a threshold to the dies in FIG. 3E, which removes two values.

The threshold may be set in an iterative manner. For example, a pixel sensitivity threshold is set, a fine segment mask is calculated, defocus detection is performed, and the results are evaluated. If the results need improvement, the threshold is adjusted.

The steps of method 100 can be referred to as a setup step. The outputs from setup step can include a color combination, a second (fine) segment mask, and a detection threshold.

A training wafer with focus modulations may be selected. For example, a training wafer with focus modulations (e.g., a focus exposure matrix (FEM) wafer) may be selected.

The wafer can include multiple dies. The generating and the calculating can be repeated for each of the dies on the wafer.

After the second segment mask is generated, detection may be performed on production wafers. Anything above the threshold can be marked as defocus. This can be referred to as a detection step. In an embodiment, the detection step of every wafer to be tested includes calculating the color combination as in the setup step; calculating difference intensity in the fine segment mask; applying a detection threshold to difference intensity; and obtaining a defocus detection result.

Figure 4:
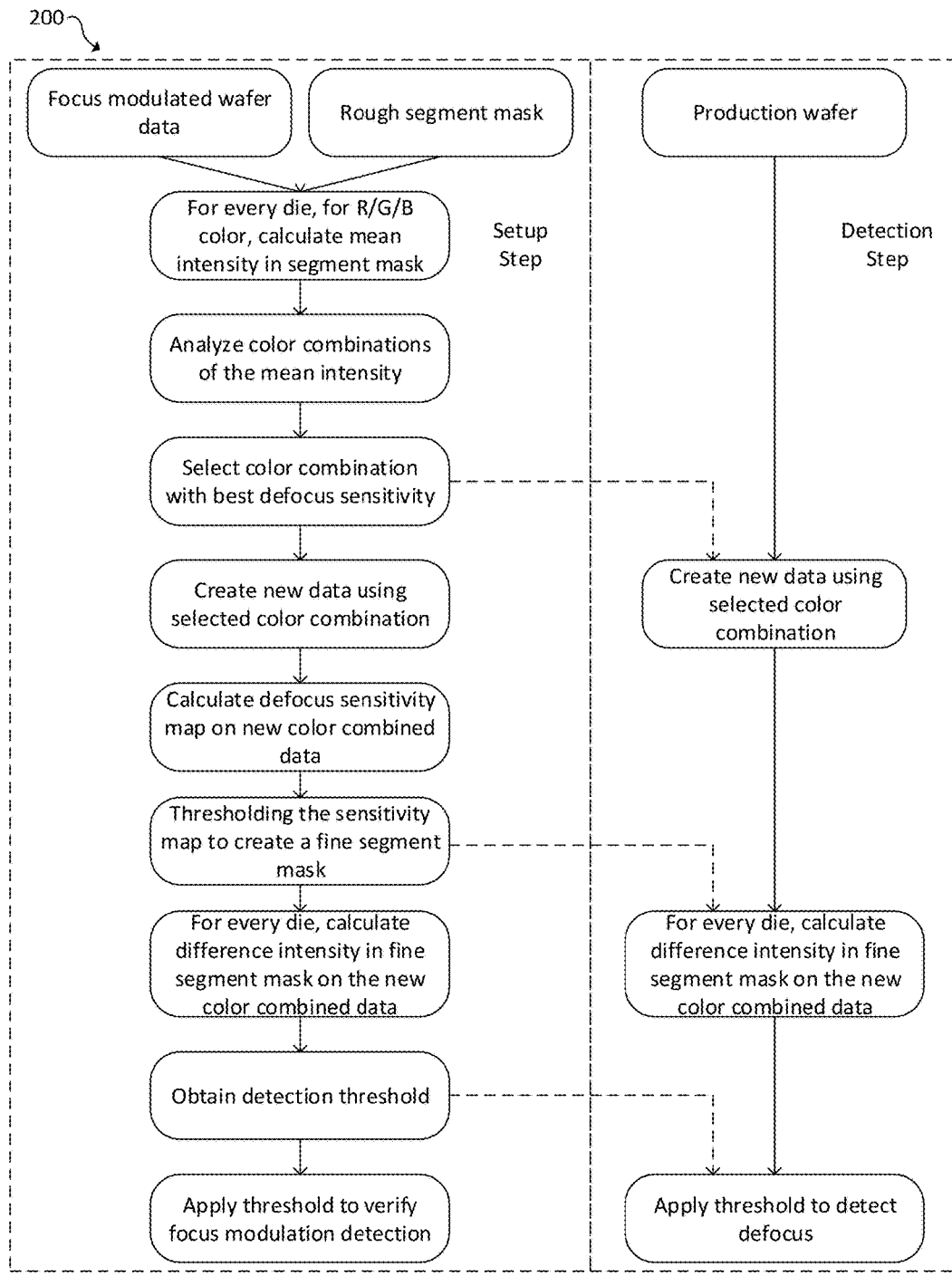
FIG. 4 is a flowchart of another embodiment of a method in accordance with the present disclosure.

FIG. 4 is a flowchart of another embodiment of a method 200. This embodiment illustrates defocus detection on production wafers. The dotted lines indicate that the output from the setup step is used as input to the detection step. The three steps in detection may be identical to the corresponding ones in the setup step other than the steps in detection use a production wafer.

The algorithm disclosed herein combines multiple color source data to form a new data source, which is more sensitive to defocus signal than the original color source data.

The algorithm creates a segment mask which may contain only pixels that are most sensitive to defocus signal. Defocus detection may be done only on pixels in the segment mask, which minimizes false detection.

The per-pixel result can be improved by taking die average or field (reticle) average to further suppress the impact from real wafer defect (such as particles or scratches) and process variation. Thus, the average intensity can avoid artifacts or noise.

In another embodiment, instead of performing detection on each pixel, the average intensity of all pixels in a segment mask within a die or reticle can be used. The advantage of die-average or reticle-average is that the impact from real defects (such as particles or scratches) or local process variation can be suppressed.

Figure 5:
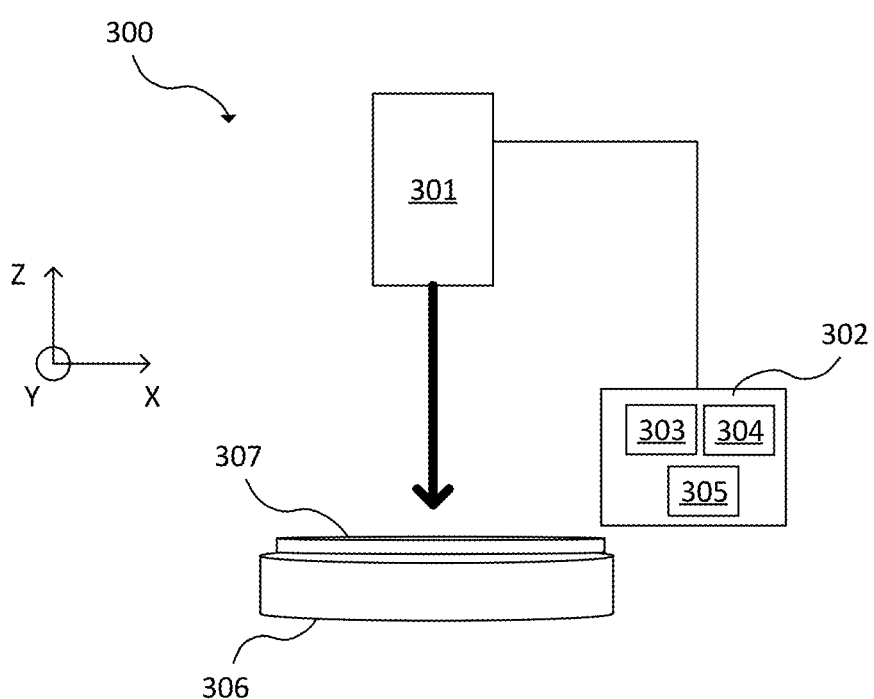
FIG. 5 is a block diagram of an embodiment of a system in accordance with the present disclosure.

FIG. 5 is a block diagram of an embodiment of a system 300. The system 300 includes a chuck 306 configured to hold a wafer 307 or other workpiece. The chuck 306 may be configured to move or rotate in one, two, or three axes. The chuck 306 also may be configured to spin, such as around the Z-axis.

The system 300 also includes a measurement system 301 configured to measure a surface of the wafer 307. The measurement system 301 may produce a beam of light, a beam of electrons, broad band plasma, or may use other techniques to measure a surface of the wafer 307.

The system 300 and/or measurement system 301 may provide selectable illumination wavelengths, color-matched to CIS pixels; and adjustable sensitivity and throughput settings for defect management. A color filter can enable each pixel of the sensor in the measurement system 301 to respond to a specific color (e.g., red, green or blue). The system 300 and/or measurement system 301 can provide bright field and/or dark field illumination of the wafer 307.

The system 300 and/or measurement system 301 may provide simultaneous bright field and dark field optical channels to capture a wide range of defect types in a single pass, such as micro-lens deformation; resist and fall-on defects; color contamination; or large stains and striations.

The system 300 communicates with a controller 302. For example, the controller 302 can communicate with the measurement system 301 or other components of the system 300. The controller 302 can include a processor 303, an electronic data storage unit 304 in electronic communication with the processor 303, and a communication port 305 in electronic communication with the processor 303. It is to be appreciated that the controller 302 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 302 to implement various methods and functions may be stored in controller readable storage media, such as a memory in the electronic data storage unit 304, within the controller 302, external to the controller 302, or combinations thereof.

The controller 302 may be coupled to the components of the system 300 in any suitable manner (e.g., via one or more transmission media, which may include "wired" and/or "wireless" transmission media) such that the controller 302 can receive the output generated by the system 300, such as output from the measurement system 301. The controller 302 may be configured to perform a number of functions using the output. For instance, the controller 302 may be configured to perform an inspection of the wafer 307. In another example, the controller 302 may be configured to send the output to an electronic data storage unit 304 or another storage medium without reviewing the output. The controller 302 may be further configured as described herein.

The controller 302, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The system 300 may be part of a defect review system, an inspection system, a metrology system, or some other type of system. Thus, the embodiments disclosed herein describe some configurations that can be tailored in a number of manners for systems having different capabilities that are more or less suitable for different applications.

The controller 302 may be in electronic communication with the measurement system 301 or other components of the system 300. The controller 302 may be configured according to any of the embodiments described herein. The controller 302 also may be configured to perform other functions or additional steps using the output of the measurement system 301 or using images or data from other sources.

An additional embodiment relates to a non-transitory computer-readable medium storing program instructions executable on a controller for performing a computer-implemented method defocus detection, as disclosed herein. In particular, as shown in FIG. 5, the controller 302 can include a memory in the electronic data storage unit 304 or other electronic data storage medium with non-transitory computer-readable medium that includes program instructions executable on the controller 302. The computer-implemented method may include any step(s) of any method(s) described herein. For example, the controller 302 may be programmed to perform some or all of the steps of FIG. 1 or FIG. 4. In an instance, the controller 302 may apply a segment mask on a die thereby forming a segment on the die; calculate a mean intensity of the segment with data including red, green, and blue colors using a bright field mode and with data including red, green, and blue colors using a dark field mode; compare defocus value against the mean intensities; determine a color combination that optimizes defocus sensitivity; determine sensitivity to defocus for each pixel in the segment; apply a threshold to the sensitivity for each pixel; and generate a second segment mask on the die based on pixels that are above the threshold to the sensitivity. The memory in the electronic data storage unit 304 or other electronic data storage medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), SSE (Streaming SIMD Extension), or other technologies or methodologies, as desired.

In another embodiment, the controller 302 may be communicatively coupled to any of the various components or sub-systems of system 300 in any manner known in the art. Moreover, the controller 302 may be configured to receive and/or acquire data or information from other systems (e.g., inspection results from an inspection system such as a review tool, a remote database including design data and the like) by a transmission medium that may include wireline and/or wireless portions. In this manner, the transmission medium may serve as a data link between the controller 302 and other subsystems of the system 300 or systems external to system 300.

In some embodiments, various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single controller 302 (or computer system) or, alternatively, multiple controllers 302 (or multiple computer systems). Moreover, different sub-systems of the system 300 may include one or more computing or logic systems. Therefore, the above description should not be interpreted as a limitation on the present disclosure but merely an illustration.

As used throughout the present disclosure, a "wafer" may refer to a substrate formed of a semiconductor or non-semiconductor material. For example, a semiconductor or non-semiconductor material may include, but is not limited to, monocrystalline silicon, gallium arsenide, or indium phosphide. A wafer may include one or more layers. For example, such layers may include, but are not limited to, a resist, a dielectric material, a conductive material, or a semiconductive material. Many different types of such layers are known in the art, such as, but not limited to, isolation layers, implantation layers, and the like. The term "wafer" as used herein is intended to encompass a substrate on which any of such layers may be formed.

Each of the steps of the method may be performed as described herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
    applying, using a controller, a segment mask on a die of a wafer thereby forming a segment on the die;
    calculating, using the controller, a mean intensity of the segment in red, green, and blue colors using a bright field mode and in red, green, and blue colors using a dark field mode;
    comparing, using the controller, defocus value against the mean intensities;
    determining, using the controller, a color combination that optimizes defocus sensitivity;
    determining, using the controller, sensitivity to defocus for each pixel in the segment;
    applying, using the controller, a threshold to the sensitivity for each pixel; and
    generating, using the controller, a second segment mask on the die based on pixels that are above the threshold to the sensitivity.

2. The method of claim 1, wherein the wafer is a training wafer with focus modulations.

3. The method of claim 1, wherein the wafer includes a plurality of the dies, and wherein the generating and the calculating are repeated for each of the dies on the wafer.

4. The method of claim 1, wherein the segment mask is configured to cover part of the die.

5. The method of claim 1, wherein the comparing includes generating a scatter plot of defocus value versus the mean intensity.

6. The method of claim 1, further comprising adjusting the threshold using the controller.

7. The method of claim 1, wherein an average intensity of all pixels within a die is used when applying the threshold to the sensitivity for each pixel.

8. A non-transitory computer readable medium storing a program configured to instruct a processor to:
    apply a segment mask on a die thereby forming a segment on the die;
    calculate a mean intensity of the segment with data including red, green, and blue colors using a bright field mode and with data including red, green, and blue colors using a dark field mode;
    compare defocus value against the mean intensities;
    determine a color combination that optimizes defocus sensitivity;
    determine sensitivity to defocus for each pixel in the segment;
    apply a threshold to the sensitivity for each pixel; and generate a second segment mask on the die based on pixels that are above the threshold to the sensitivity.

9. The non-transitory computer readable medium of claim 8, wherein a wafer includes a plurality of the dies, and wherein the generating and the calculating are repeated for each of the dies on the wafer.

10. The non-transitory computer readable medium of claim 8, wherein the segment mask is configured to cover part of the die.

11. The non-transitory computer readable medium of claim 8, wherein comparing the defocus value includes generating a scatter plot of the defocus value versus the mean intensity.

12. The non-transitory computer readable medium of claim 8, wherein the program is further configured to adjust the threshold.

13. The non-transitory computer readable medium of claim 8, wherein an average intensity of all pixels within a die is used when applying the threshold to the sensitivity for each pixel.

14. A system comprising:
a chuck configured to hold a wafer;
a measurement system configured to measure a surface of the wafer, wherein the measurement system provides an image of the wafer using a bright field mode and a dark field mode; and
a controller in electronic communication with the measurement system, wherein the controller includes a processor, an electronic data storage unit in electronic communication with the processor, and a communication port in electronic communication with the processor, and wherein the controller is configured to:
apply a segment mask on a die of the wafer thereby forming a segment on the die;
calculate a mean intensity of the segment with data including red, green, and blue colors using the bright field mode and with data including red, green, and blue colors using the dark field mode;
compare defocus value against the mean intensities;
determine a color combination that optimizes defocus sensitivity;
determine sensitivity to defocus for each pixel in the segment;
apply a threshold to the sensitivity for each pixel; and
generate a second segment mask on the die based on pixels that are above the threshold to the sensitivity.

15. The system of claim 14, wherein the wafer includes a plurality of dies.

16. The system of claim 14, wherein the segment mask applied by the controller is configured to cover part of the die.

17. The system of claim 14, wherein comparing the defocus value includes generating a scatter plot of the defocus value versus the mean intensity.

18. The system of claim 14, wherein the controller is further configured to adjust the threshold.

19. The system of claim 14, wherein an average intensity of all pixels within a die is used when applying the threshold to the sensitivity for each pixel.

* * * * *